G. L. WOODJARD.
SPRING OILER.
APPLICATION FILED JUNE 27, 1918.

1,301,529.

Patented Apr. 22, 1919.

INVENTOR.
Guy L. Woodjard
BY A.B.Bowman
ATTORNEYS.

UNITED STATES PATENT OFFICE.

GUY L. WOODJARD, OF SAN DIEGO, CALIFORNIA.

SPRING-OILER.

1,301,529.   Specification of Letters Patent.   Patented Apr. 22, 1919.

Application filed June 27, 1918. Serial No. 242,145.

*To all whom it may concern:*

Be it known that I, GUY L. WOODJARD, a citizen of the United States, residing at San Diego, in the county of San Diego and State of California, have invented certain new and useful Improvements in Spring-Oilers, of which the following is a specification.

My invention relates to a device for lubricating springs for vehicles and the like, and the objects of my invention are: first, to provide a device of this class which may be readily secured to the vehicle spring by inserting a portion thereof between two of the leaves of the spring which portion supports an oil reservoir which will permit the oil to run down on the side of the spring and between the leaves of the spring for lubricating the same: second, to provide a device of this class in which the inserted portion may be bent against the edge of one leaf of the spring on the opposite edge from the reservoir so that the spring oiler is positively secured in position: third, to provide a spring oiler of this class which may be easily, readily and securely installed in position on the spring: fourth, to provide a device of this class with means for preventing the oil from flowing too freely down the sides of the spring and for retaining the oil between the leaves of the spring, and fifth, to provide a device of this class which is simple and economical of construction, durable, easy to install and which will not readily lose off, deteriorate or get out of order.

Figure 1:
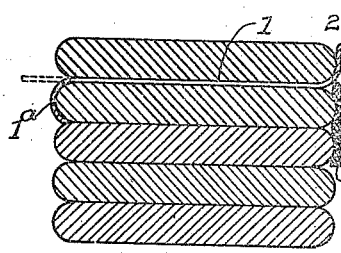
Figure 2:
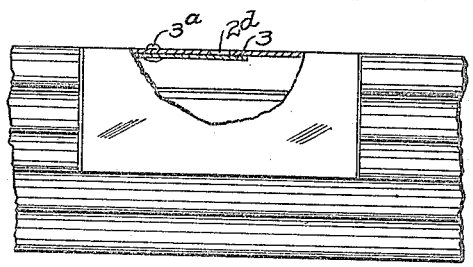
Figure 3:
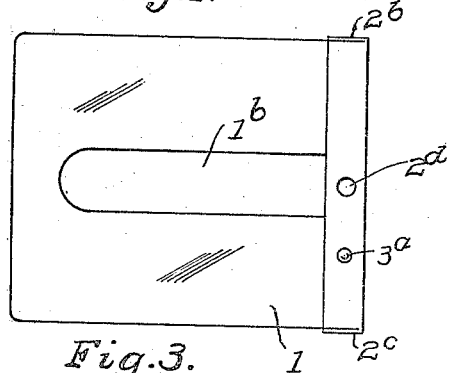
Figure 7:
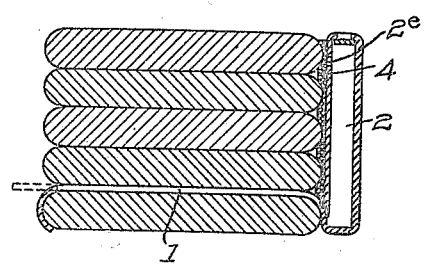
Figures 4, 5:
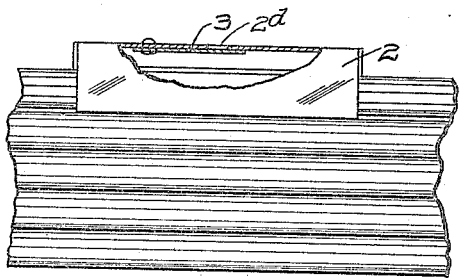
Figure 6:
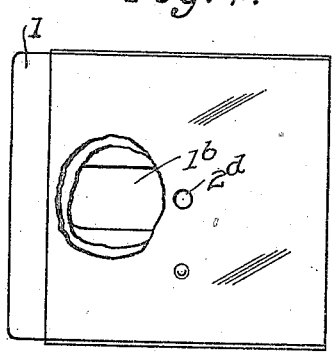

With these and other objects in view as will appear hereinafter my invention consists of certain novel features of construction, combination, and arrangement of parts and portions as will be hereinafter described in detail and particularly set forth in the appended claims, reference being had to the accompanying drawings and to the characters of reference thereon which form a part of this specification in which:

Figure 1 is a transverse section view of a vehicle spring showing my spring oiler in section in its preferred form secured in position thereon by solid lines and showing the extended end of the inserted portion before bending, by dotted lines. Fig. 2 is a fragmentary side elevational view of a vehicle spring showing said oiler mounted thereon in position and showing a portion broken away and in section to facilitate the illustration. Fig. 3 is a top or plan view of the spring oiler itself before being positioned on the spring. Fig. 4 is a transverse sectional view of a vehicle spring and showing a modified form of my spring oiler in position thereon in section, by solid lines and showing by dotted lines the extended end of the inserted portion before being bent in position against the edge of the spring leaf. Fig. 5 is a fragmentary side elevational view of a vehicle spring showing the modified form of spring oiler mounted in position thereon and showing a portion broken away and in sections to facilitate the illustration. Fig. 6 is a top or plan view of the modified form of oiler before being inserted on the spring and showing portions broken away to facilitate the illustration, and Fig. 7 is a transverse sectional view of a vehicle spring showing a spring oiler in another modified form in section by solid lines and showing by dotted lines the positions of the extended end of the inserted portion before being bent against the edge of the leaf of the spring.

Similar characters of reference refer to similar parts and portions throughout the several views of the drawings.

The insert portion 1, oil reservoir 2, oil hole cover 3, and felt oil retainer 4 constitute the principal parts and portions of my spring oiler. In the preferred form of spring oiler shown in Figs. 1, 2 and 3 the insert portion 1 consists of a thin metallic member adapted to be inserted between any two leaves of the spring, preferably the upper two leaves and the end extends through a sufficient distance to be bent against the edge of the spring leaf as shown at 1$^a$ for holding the same in position. This insert portion is provided in the middle with a slot 1$^b$ as shown best in Fig. 3 of the drawings adapted to permit oil from the reservoir to be retained in said slot between the leaves of the spring and seep out gradually with the movement of the spring. The other end of said support 1 is formed into a reservoir by bending the metal upwardly then downwardly then inwardly toward the spring then upwardly again leaving a space 2$^a$ for the oil to seep through, the ends 2$^b$ and 2$^c$ being closed and soldered, mounted between the inner surface of the reservoir 2 and the edge of the spring preferably glued to said reservoir is a piece of felt or fabric material 4, the upper edge of which extends into the space 2$^a$ for regulating the quantity of oil from the reservoir 2. In the upper portion of the reservoir 2 is an oil hole 2ᵈ which is covered by a spring 3 which is riveted to the upper portion of said reservoir by means of a rivet 3ᵃ. This spring is adapted to prevent dirt from entering the reservoir 2 and is depressed by the end of the oil can spout when filling the reservoir 2 with oil.

In the modified form of construction shown in Figs. 4, 5 and 6 of the drawings the insert portion 1 is the same as that of the preferred form of construction, but the reservoir 2 is formed so as to lie over the top of the top leaf of the spring instead of against the sides of the spring as shown in the preferred form of construction and the felt 4 is eliminated. This reservoir is also provided with an oil hole and oil hole cover the same as the reservoir in the preferred form.

In the modified form of construction shown in Fig. 7 of the drawings the insert portion 1 is the same as in the other forms but this insert portion is adapted to be mounted preferably between the two lower leaves of the spring and the reservoir extends upwardly to the top of the spring and it is provided with an oil outlet orifice 2ᵉ near its top inner side and with felt or other fabric 4 between the inner side of the reservoir and the side of the spring.

Though I have shown and described a particular construction, combination and arrangement of parts and portions and certain modifications thereof I do not wish to be limited to this particular construction, combination and arrangement nor to the modifications thereof, but desire to include in the purview of my invention the construction, combination and arrangement substantially as set forth in the appended claims.

It is obvious that with this construction there is provided an oiling device for lubricating vehicle springs in which a portion thereof may be readily inserted between two leaves of the spring for supporting the device in position and if necessary or desirable the end may be turned down against the edge of the spring securing it rigidly in position, and an oil retaining reservoir formed in the other end thereof adapted to retain the oil and permit its seepage along the sides of the spring, that the slot 1ᵃ in the insert portion provides a retainer for oil which may seep into said slot and, that the oil will gradually work out with the action of the spring and run down on both sides of the spring, that the felt will prevent a too free exit of the oil from the reservoir, and also forms a cushion between the reservoir and spring.

Having thus described my invention what I claim as new and desire to secure by Letters Patent, is:

1. In a spring oiler, the combination with a plurality leaf vehicle spring, of a flat metallic insert member inserted between two leaves of said spring and a reservoir secured to one side thereof.

2. In a spring oiler, the combination with a plurality leaf vehicle spring, of a flat metallic insert member inserted between two leaves of said spring and a reservoir secured to one side thereof against the outer surface of said spring.

3. In a spring oiler, the combination with a plurality leaf vehicle spring, of a flat metallic insert portion inserted between two leaves of said spring with one edge bent over against the edge of the leaf of the spring and an oil reservoir secured to the opposite side thereof adapted to rest against the outer surface of the spring.

4. In a spring oiler the combination of a thin flat metallic insert portion adapted to be inserted between the two leaves of a vehicle spring, provided with a slot therein, adapted for an oil retainer and a reservoir supported by said insert portion resting against the outer face of the spring.

5. In a spring oiler the combination of a thin flat metallic portion adapted to be inserted between the two leaves of a vehicle spring, provided with a slot therein, adapted for an oil retainer and a reservoir supported by said insert portion resting against the outer face of the spring, and a piece of felt mounted between said reservoir and the edges of the leaf of the spring.

6. In a spring oiler the combination of a thin flat metallic portion adapted to be inserted between the two leaves of a vehicle spring, provided with a slot therein, adapted for an oil retainer, a reservoir supported by said insert portion resting against the outer face of the spring, a piece of felt mounted between said reservoir and the edges of the leaf of the spring, an oil hole in the upper surface of said reservoir and means for covering said oil hole.

In testimony whereof, I have hereunto set my hand at San Diego, California, this 20th day of June, 1918.

GUY L. WOODJARD.